US009394923B2

(12) United States Patent
Faccio et al.

(10) Patent No.: US 9,394,923 B2
(45) Date of Patent: Jul. 19, 2016

(54) LIFT SYSTEM WITH FOLLOWER SYSTEM

(71) Applicant: Lift Systems, Inc., Moline, IL (US)

(72) Inventors: Timothy J. Faccio, Sherrard, IL (US); Christopher R. Perkins, Lynn Center, IL (US); Richard Lynn McWilliams, Colona, IL (US)

(73) Assignee: LIFT SYSTEMS, INC., Moline, IL (US)

( * ) Notice: Subject to any disclaimer, the term of this patent is extended or adjusted under 35 U.S.C. 154(b) by 415 days.

(21) Appl. No.: 14/018,065

(22) Filed: Sep. 4, 2013

(65) Prior Publication Data

US 2014/0069088 A1 Mar. 13, 2014

Related U.S. Application Data

(60) Provisional application No. 61/698,161, filed on Sep. 7, 2012.

(51) Int. Cl.

| | |
|---|---|
| ***F16D 31/02*** | (2006.01) |
| ***F15B 11/17*** | (2006.01) |
| ***B66C 5/02*** | (2006.01) |
| ***B66C 15/00*** | (2006.01) |
| ***B66C 17/06*** | (2006.01) |
| ***F15B 15/02*** | (2006.01) |

(52) U.S. Cl.

CPC . *F15B 11/17* (2013.01); *B66C 5/02* (2013.01); *B66C 15/00* (2013.01); *B66C 17/06* (2013.01); *F15B 15/02* (2013.01); *F15B 2211/8757* (2013.01)

(58) Field of Classification Search

CPC ................ F15B 11/0445; F15B 11/17; F15B 2211/8757; B66C 5/02; B66C 5/04; B66C 7/08; B66C 7/14; B66C 19/00

See application file for complete search history.

(56) References Cited

U.S. PATENT DOCUMENTS

| | | | | |
|---|---|---|---|---|
| 3,613,503 A * | 10/1971 | Phillips | ................ | F15B 15/222 91/26 |
| 4,381,839 A | 5/1983 | Engler et al. | | |

FOREIGN PATENT DOCUMENTS

| | | |
|---|---|---|
| SU | 688419 A1 | 9/1979 |

OTHER PUBLICATIONS

European Patent Office, European Search Report for Patent Application No. 13004349.0-1705 / 2706033 (Aug. 1, 2014).

* cited by examiner

*Primary Examiner* — Michael Leslie
(74) *Attorney, Agent, or Firm* — Leydig, Voit & Mayer, Ltd.

(57) ABSTRACT

A hydraulic lifting apparatus includes a main hydraulic cylinder and main hydraulic circuit operatively connected to the main hydraulic cylinder. First and second spaced apart follower hydraulic cylinders are also provided. A hydraulic lifting system includes first and second lift towers. Each lift tower includes a main hydraulic cylinder, a main hydraulic circuit, and at least one follower hydraulic cylinder. A follower hydraulic circuit is operatively connected to the at least one follower hydraulic cylinder. A lifting beam spans between the first and second lift towers. The main hydraulic cylinder of each tower is positioned along the beam axis.

14 Claims, 8 Drawing Sheets

LIFT SYSTEM WITH FOLLOWER SYSTEM

CROSS-REFERENCE TO RELATED APPLICATIONS

This patent application claims the benefit of U.S. Provisional Patent Application No. 61/698,161, filed Sep. 7, 2012, which is incorporated by reference.

TECHNICAL FIELD

This disclosure relates generally to systems and methods for lifting heavy objects and, more particularly, to a system and a method for providing redundant lifting for emergency protection.

BACKGROUND

Various systems and methods of lifting and moving heavy objects have been developed. Some systems such as a gantry crane system use pairs of lift towers to lift a heavy object. Each lift tower includes a single hydraulic cylinder on a base which extend and retract to raise and lower the object. The lift cylinders may be single or multi-stage. In some cases, the lift towers may include a frame or boom member surrounding the hydraulic cylinders.

Safety devices are typically used with the lift towers to prevent or reduce the likelihood that a heavy object will be inadvertently lowered. Some systems use mechanical pins or rods that extend into holes in the boom to mechanically secure the lift towers at certain predetermined positions. Other systems such as that disclosed in U.S. Pat. No. 8,322,687 A1 utilize a wedge lock system to provide a mechanical lock to prevent inadvertent retraction of the lift towers.

In addition, the valves within the hydraulic system may be configured to also reduce the likelihood of inadvertently lowering of a heavy object. For example, the valves used to direct the flow of hydraulic fluid may limit the flow of hydraulic fluid from the hydraulic cylinders and thus, to some extent, maintain the hydraulic cylinders in position even in the absence of hydraulic pressure from the source. Still further, counterbalance or check valves may be used to permit the flow of hydraulic fluid in one direction but prevent flow in an opposite direction absent a desired level of hydraulic pressure controlling the counterbalance valve.

In the event of a failure within the hydraulic system, the lift towers will be retained in their extended condition supporting the load of the lifted object. This condition presents an especially undesirable environment for repair of the hydraulic system and contributes to an overall delay in reaching the objective associated with the purpose of the lift. Accordingly, it has been determined that a system for redundant operation of the lift towers is a desirable attribute of a system and an enhancement of overall safety. It has been determined that a desirable feature of such hydraulic lift systems would be to provide alternative lift capability in the event of incapacity of the main lift cylinders.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY OF THE DISCLOSURE

In one aspect, a hydraulic lifting apparatus includes a main hydraulic cylinder movable between an extended position and a retracted position, a main hydraulic circuit operatively connected to the main hydraulic cylinder, and first and second spaced apart follower hydraulic cylinders. Each of the first and second spaced apart follower hydraulic cylinders is movable between an extended position and a retracted position.

In another aspect, a hydraulic lifting system includes a first lift tower and a second lift tower spaced from the first lift tower. The first lift tower and the second lift tower define an object lifting area between the first lift tower and the second lift tower. Each of the first lift tower and the second lift tower include a main hydraulic cylinder movable between an extended position and a retracted position, a main hydraulic circuit operatively connected to the main hydraulic cylinder, and at least one follower hydraulic cylinder. Each follower hydraulic cylinder is movable between an extended position and a retracted position. A follower hydraulic circuit is operatively connected to the at least one follower hydraulic cylinder. A lifting beam spans between the first and second lift towers and across the object lifting area. The lifting beam has a beam axis and the main hydraulic cylinder of each tower is positioned along the beam axis.

In still another aspect, a hydraulic lifting system includes a first hydraulic cylinder movable between an extended position and a retracted position and has an extend side and a retract side. A second hydraulic cylinder is movable between a retracted position and an extended position. A header beam is supported by the first hydraulic cylinder and the second hydraulic cylinder. A hydraulic circuit is operatively connected to the first hydraulic cylinder and has an extend side first cylinder selector valve, a retract side first cylinder selector valve, an extend side first cylinder counterbalance valve, and a retract side first cylinder counterbalance valve. The extend side first cylinder selector valve is operatively connected to the extend side of the first hydraulic cylinder and the retract side first cylinder selector valve is operatively connected to the retract side of the first hydraulic cylinder. The extend side first cylinder counterbalance valve regulates flow of hydraulic fluid at the extend side of the first hydraulic cylinder, and the retract side first cylinder counterbalance valve regulates flow of hydraulic fluid at the retract side of the first hydraulic cylinder. The extend side first cylinder selector valve is movable between first and second operative positions and the hydraulic circuit is configured to permit hydraulic fluid to flow through the extend side first cylinder selector valve and the extend side first cylinder counterbalance valve when the extend side first cylinder selector valve is at the first position, and permit hydraulic fluid to flow through the extend side first cylinder selector valve and bypass the extend side first cylinder counterbalance valve when the extend side first cylinder selector valve is at the second position. The retract side first cylinder selector valve is movable between first and second operative positions and the hydraulic circuit is configured to permit hydraulic fluid to flow through the retract side first cylinder selector valve and the retract side first cylinder counterbalance valve when the retract side first cylinder selector valve is at the first position, and through the retract side first cylinder selector valve and bypass the retract side first cylinder counterbalance valve when the retract side first cylinder selector valve is at the second position.

DETAILED DESCRIPTION

Figure 1:
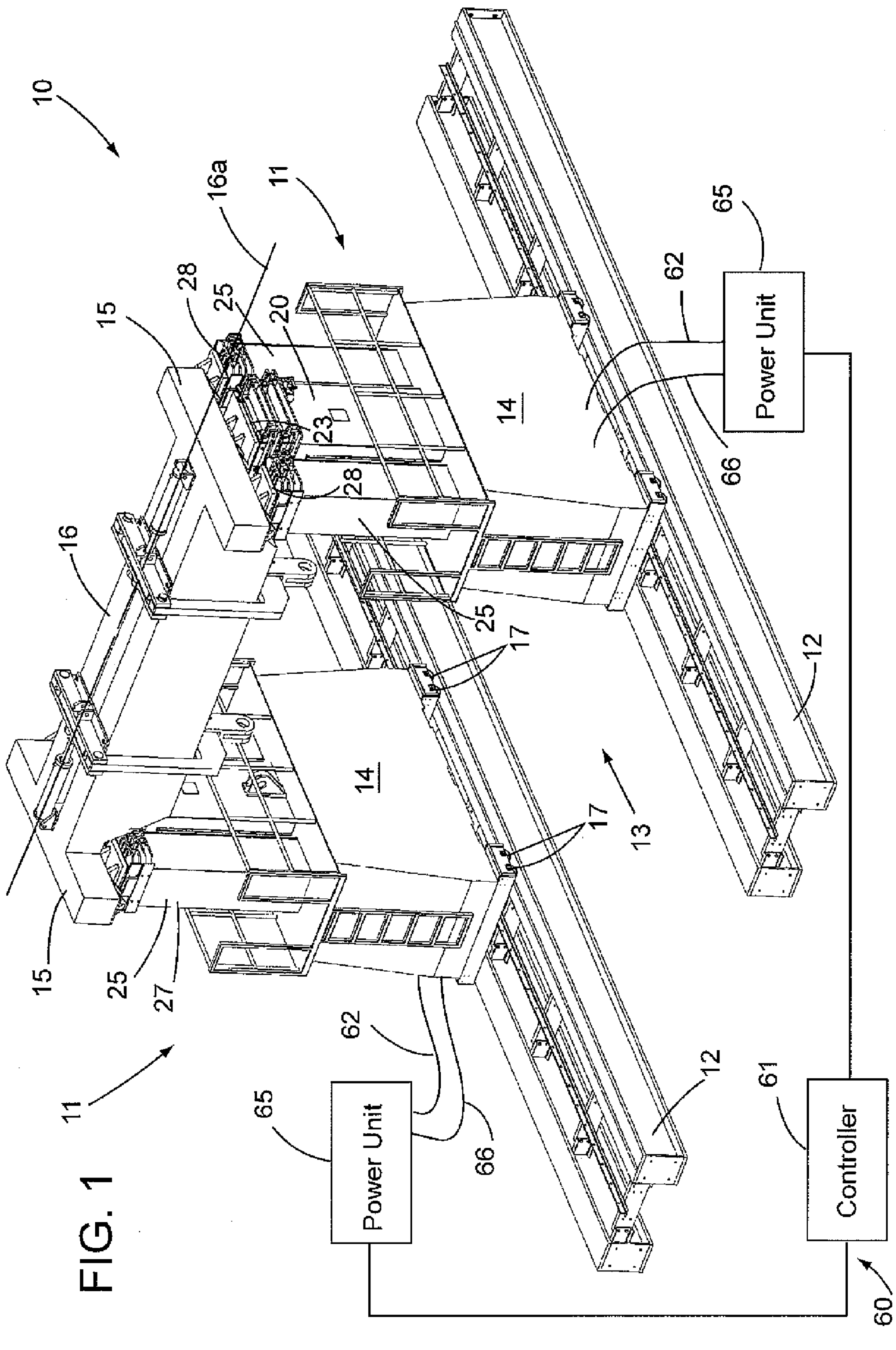
FIG. 1 is a perspective view of a gantry crane system incorporating the redundant configuration disclosed herein.
Figure 2:
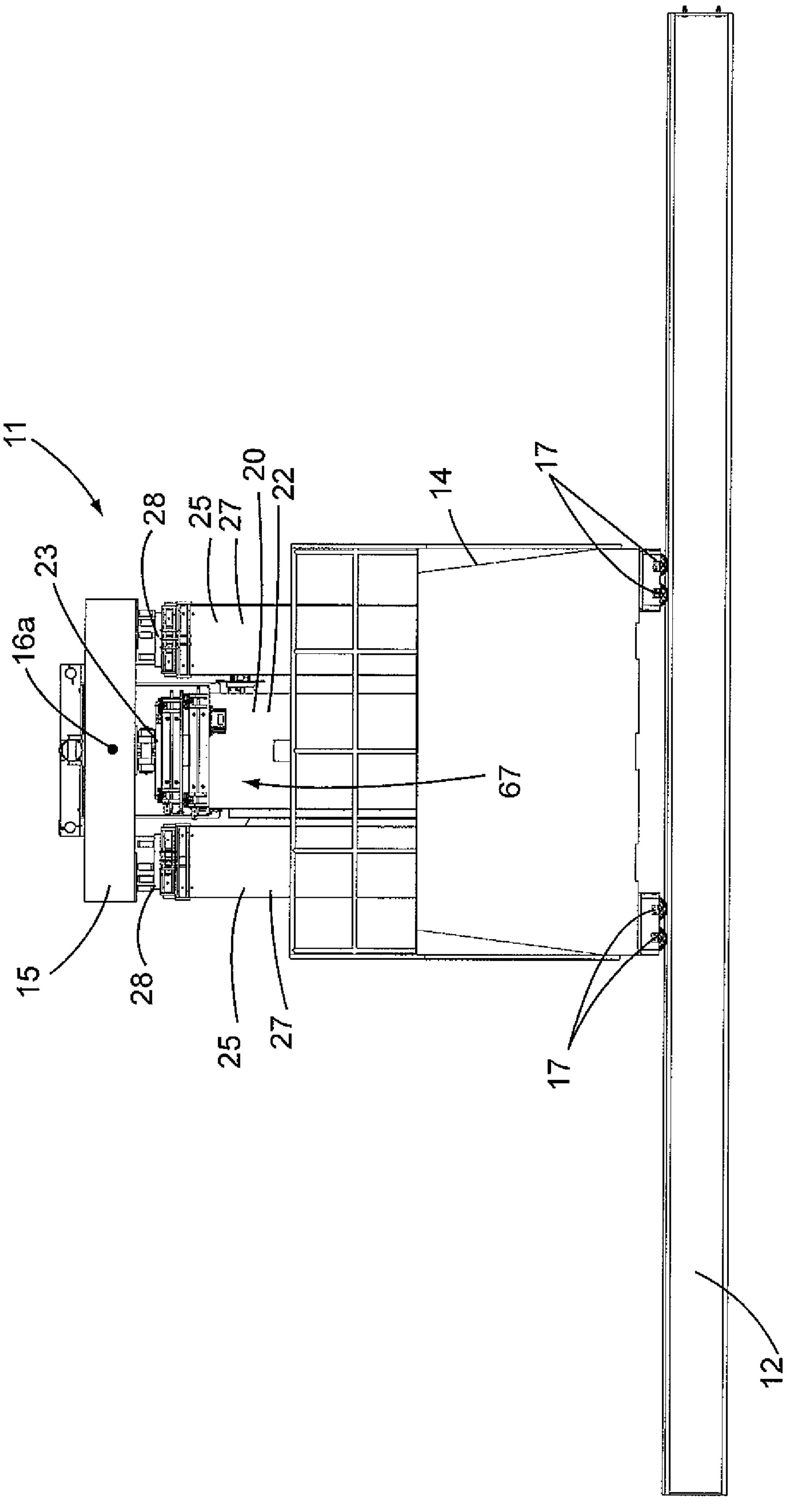
FIG. 2 is a side view of a lift tower incorporating the disclosed redundant configuration of the gantry crane system of FIG. 1.
Figure 3:
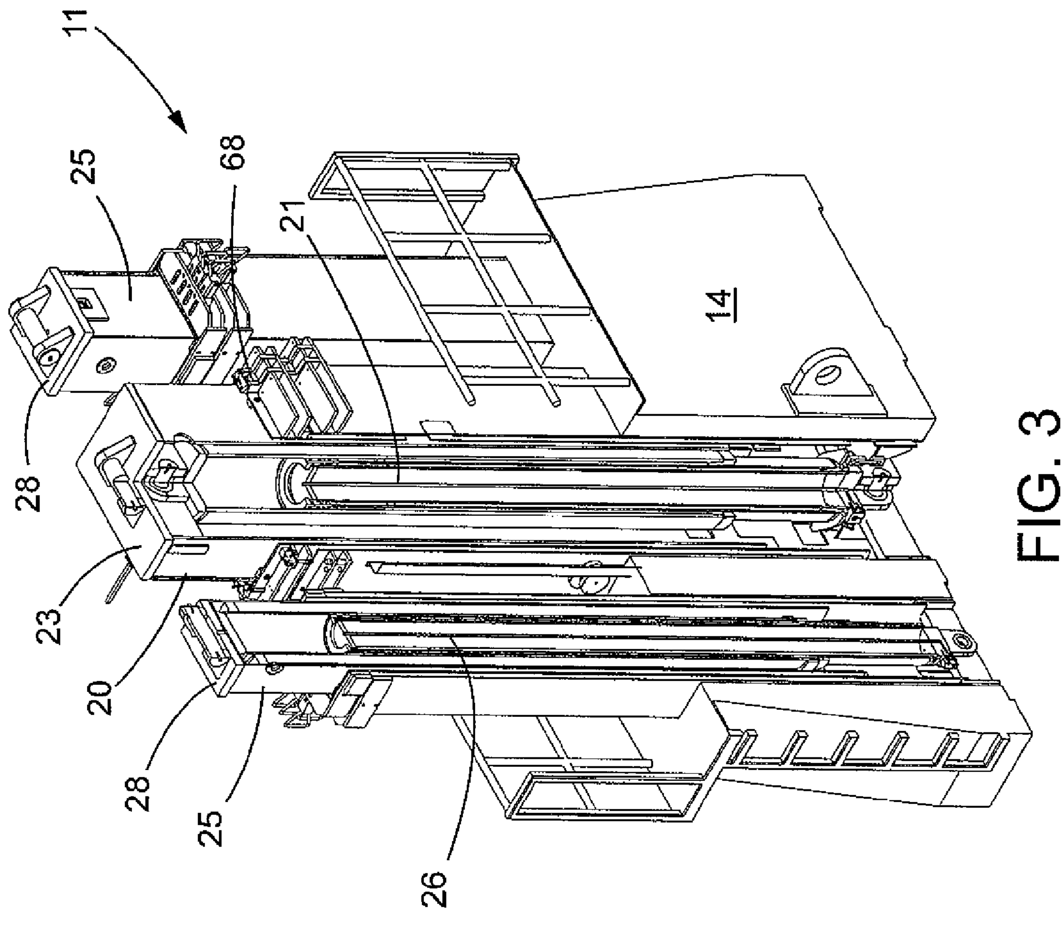
FIG. 3 is a cutaway perspective view of one of the lift towers of FIG. 2.
Figure 4:
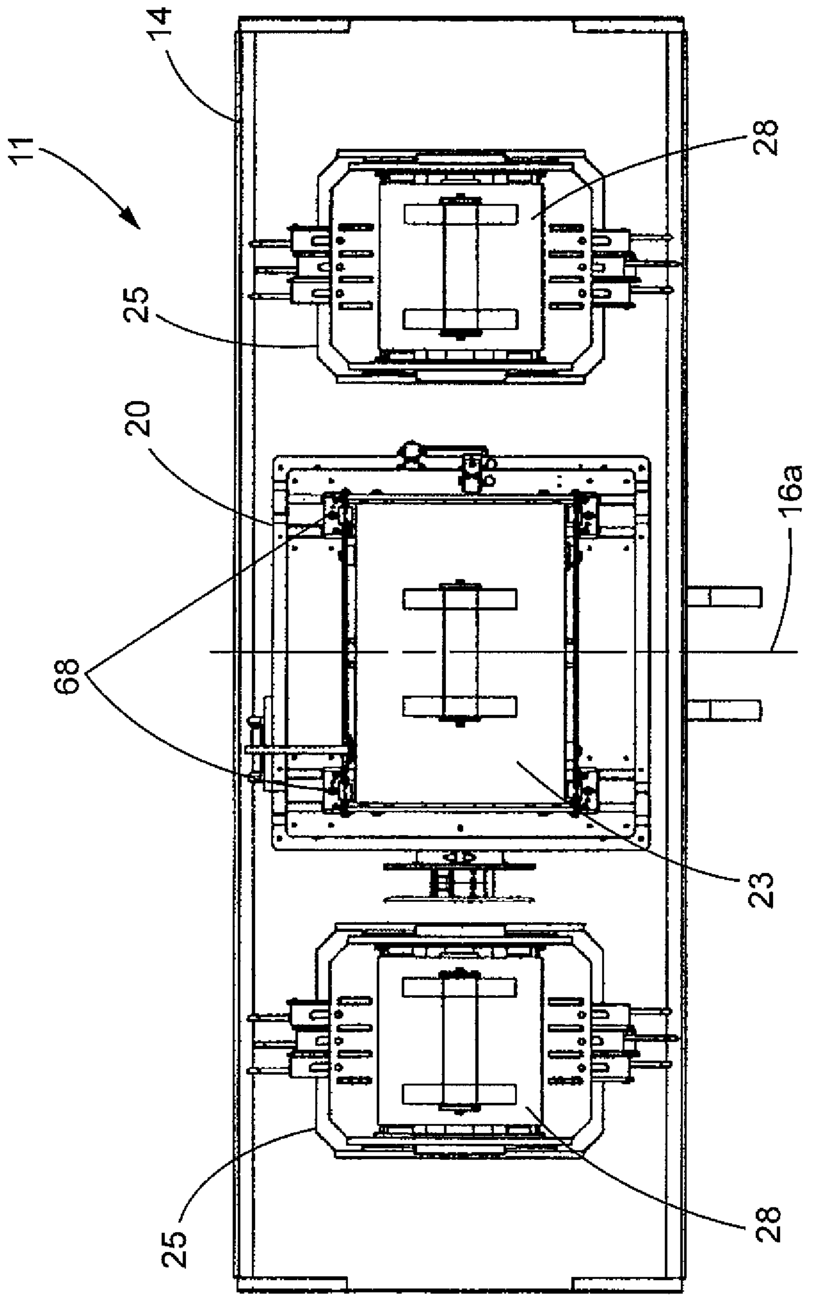
FIG. 4 is a top plan view of one of the lift towers of FIG. 2.

FIG. 1 depicts a lifting arrangement such as a hydraulic gantry crane system indicated generally at 10 for use in lifting and moving heavy objects. The gantry crane system 10 includes a plurality of lifting devices such as lift towers 11 that are arranged in pairs and may be mounted on spaced apart runway tracks 12. In FIG. 1, the gantry crane system 10 would be positioned with the object to be moved (not shown) within the space or object lifting area 13 between the runway tracks 12. The lift towers 11 are moveably mounted on the runway tracks 12. It should be noted that only a portion of the runway tracks 12 is depicted. In practice, the runway tracks 12 typically extend along the entire path of movement of the object to be moved. Other manners of guiding the movement of the lift towers 11 are contemplated.

Referring to FIGS. 1-4, each lift tower 11 has a base 14 with a centrally positioned main lift tower 20. Main lift tower 20 has a multi-stage telescoping main lift hydraulic cylinder 21 mounted therein. In an alternate embodiment, a single stage cylinder may be used. The main lift cylinder 21 may be enclosed within a box-like telescoping boom member 22. In an alternate embodiment, the boom member 22 of the main lift tower 20 may be omitted so that the outer surfaces of the main lift cylinder 21 are exposed.

In accordance with the present disclosure, the system includes a pair of load follower towers 25, each tower being positioned on opposite sides of the main tower 11 on each base 14. Each load follower tower 25 has a multi-stage telescoping follower hydraulic cylinder 26 mounted therein. In an alternate embodiment, a single stage cylinder may be used. The follower cylinders 26 may be enclosed within a box-like telescoping boom member 27. The load follower towers 25 and the follower cylinders 26 of each lift tower 11 may be symmetrically positioned on opposite sides of the main lift tower 20 and the main lift cylinder 21. In an alternate embodiment, the boom member 27 may be omitted and the outer surfaces of the follower cylinders 26 exposed. In one embodiment, as illustrated, each of the load follower towers 25 may be configured to support fifty percent of the capacity of the main lift tower 20. The load follower towers 25 are provided to provide a system for redundant operation of the lift towers 11.

The upper end of main lift tower 20 may include a main platen 23 and the upper end of each load follower tower 25 may include an outer or load follower platen 28. A beam such as header plate beam 15 is mounted on and secured to each of the main platen 23 and the load follower platens 28. As such, the main lift tower 20 and main lift cylinder 21 as well as the follower lift towers 25 and follower cylinders 26 support header plate beam 15. A lifting beam 16 may extend between aligned lift towers 11 along a beam axis **16*a* and extend across or span the runway tracks 12. Lifting beam 16 may be integrally formed with the header plate beams 15 as depicted or may be a separate component mounted on the header plate beams. In either case, the lifting beam 16 is supported by the header plate beams 15. The addition of load follower towers 25 on opposite sides of main lift tower 20 may add to the stability of lifting beam 16. In other words, by positioning the load follower towers 25 symmetrically about the main lift tower 21 (i.e., with the load follower towers 25 and the follower cylinders 26 equidistant from the beam axis 16*a*), the stability of the header plate beam 15 and thus the lifting beam 16 may be increased for some lifting operations. Rigging structure (not shown) may be mounted on the lifting beams 16 and may be operatively connected to the object to be moved. More than one pair of lift towers 11 and lifting beams 16** may be used to lift and move an object, if desired.

The base 14 of each lift tower 11 may have wheels 17 to permit the lift tower 11 to be moved along the runway track 12. Some or all of the wheels 17 may be driven by a hydraulic motor (not shown). Other types of drive members are contemplated including other mechanisms for powering the wheels 17 as well as hydraulic cylinders (not shown) that may be connected to each lift tower 11 and the runway track 12 and that may be extended or retracted to move the lift towers along the track.

Each lift tower 11 may include a plurality of electrical inputs and hydraulic inputs through which electrical power and signals as well as hydraulic power in the form of pressurized hydraulic fluid may pass. Hydraulic power may be provided to each lift tower through hydraulic circuitry or conduits 66 from a power unit 65 (FIG. 1). Each power unit 65 may provide the pressurized hydraulic fluid necessary to extend and retract the main lift cylinder 21 and the follower hydraulic cylinders 26 as well as power the drive mechanism associated with each lift tower 11. Each power unit 65 may be hydraulically connected to one of the lift towers 11 as depicted schematically in FIG. 1 or to two or more lift towers.

A control system, indicated generally at 60 in FIG. 1, may be provided to control the gantry crane system 10. Control system 60 may include one or more controllers 61 that control the lift towers 11 and power units 65 through electrical cables 62. In one configuration, the control system 60 may utilize the Controller Area Network (CAN) protocol or bus to communicate between the controllers 61 and the various components of the gantry crane system 10. Other protocols or buses may be used, if desired.

The controller 61 may be an electronic controller that operates in a logical fashion to perform operations, execute control algorithms, store and retrieve data and other desired operations. The controller 61 may include or access memory, secondary storage devices, processors and any other components for running an application. The memory and secondary storage devices may be in the form of read-only memory (ROM) or random access memory (RAM) or integrated circuitry that is accessible by the controller. Various other circuits may be associated with the controller 61 such as power supply circuitry, signal conditioning circuitry, driver circuitry, and other types of circuitry.

The controller 61 may rely on one or more data maps relating to the operating conditions of the gantry crane system 10 that may be stored in the memory of controller 61. Each of these maps may include a collection of data in the form of tables, graphs, and/or equations. The controller 61 may use the data maps to efficiently control the operation of each component (e.g., lift towers 11, power unit 65) of the gantry crane system 10.

The lift towers 11 may further include measuring devices for measuring the vertical and horizontal positions of the lift towers. The vertical position of the main platen 23 and load follower platens 28 may be measured with a sensor (not shown) such as a string potentiometer. Horizontal displacement of the lift towers 11 may be measured by using an encoder (not shown) associated with one or more of the wheels 18. Other mechanisms or systems for measuring the vertical and horizontal displacement of the lift towers 11 are contemplated including laser systems.

Figure 5:
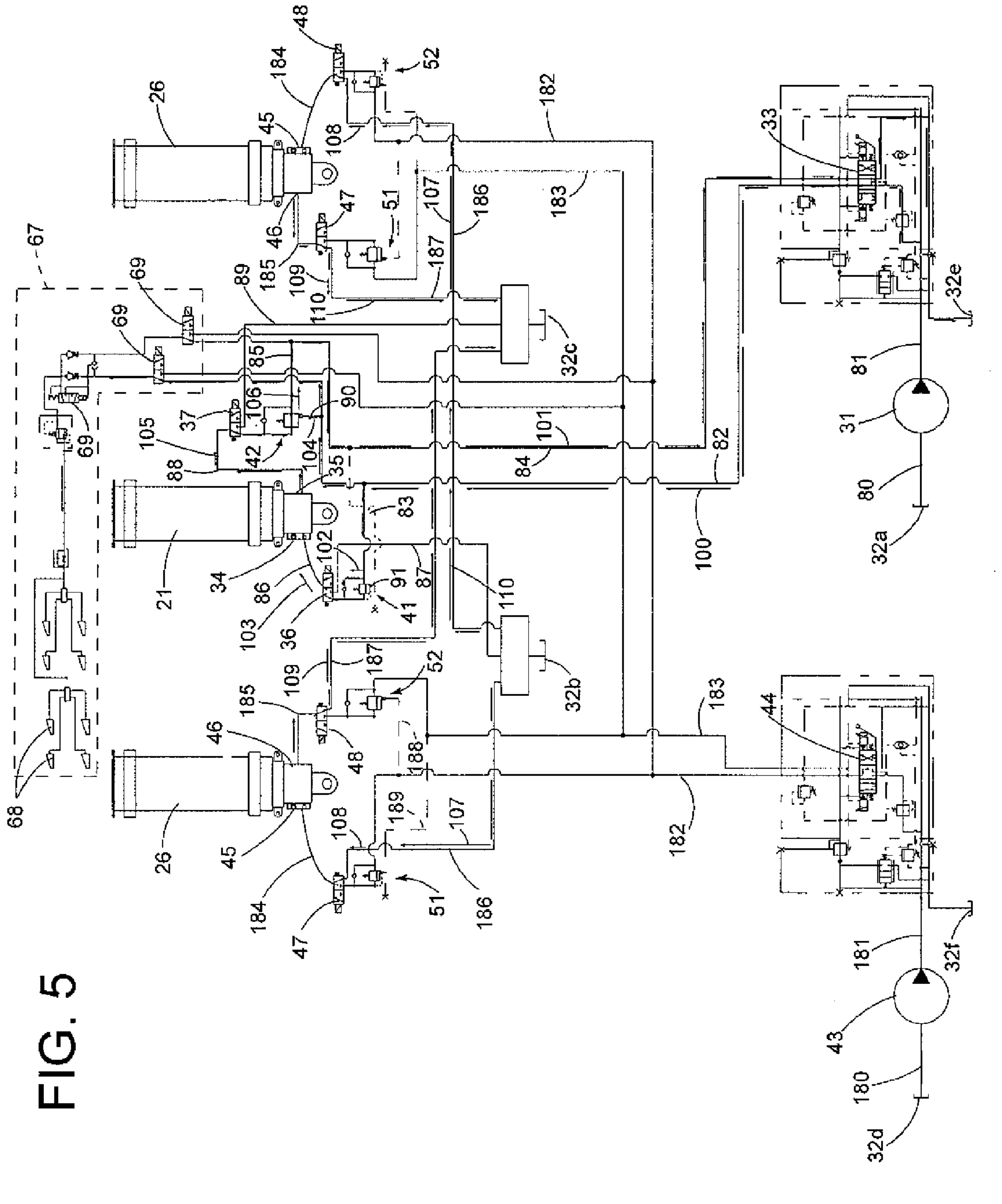
FIG. 5 is a schematic diagram of a hydraulic system used with the system of FIG. 2 depicting the main lift cylinder raising the lift tower.

Each lift tower 11 may further include various safety devices to prevent the unintended retraction of and provide additional support for the main lift tower 20 and the load follower towers 25. In the depicted example, a wedge lock system 67 is provided on the main lift tower 20 to provide a mechanical lock to prevent the individual segments of the main lift tower 20 from retracting. The wedge lock system 67 includes a plurality of wedge locks 68 (shown schematically in FIG. 5) that are biased by internal springs (not shown) to prevent retraction of the boom segments. By providing sufficient hydraulic pressure, the force of the springs may be overcome and the wedge locks 68 displaced from their locked positions to permit relative movement between the segments of the lift tower 11. Additional details of such wedge lock system 67 may be found in U.S. Pat. No. 8,322,687 A1. Hydraulic pressure to the wedge lock system 67 may be regulated by one or more wedge lock control valves 69 (FIG. 5). Other types of locking systems such as pins or rods are also contemplated and may be used separately or in combination with the wedge lock system 67 on each of the main lift tower 20 and the follower lift towers 25.

Referring to FIG. 5, a schematic depiction of a hydraulic system 30 for operating each lift tower 11 is illustrated. Hydraulic system 30 has a main tower pump 31 driven by a power supply such as power unit 65 supplied with hydraulic fluid through first main conduit member 80 from a tank or reservoir 32*a*. A plurality of reservoirs are depicted in FIG. 5 and such individual reservoirs 32 may be fluidly connected as part of a common reservoir system. As such, each reservoir is identified by a different suffix (i.e., 32*a*, 32*b* etc.). The output of the main pump 31 is operatively connected through second main conduit member 81 to main control valve 33 for controlling hydraulic fluid to the main lift cylinder 21 as well as the wedge lock system 67.

Main lift cylinder 21 has an extend side 34 into which hydraulic fluid flows to extend the main lift cylinder and a retract side 35 into which hydraulic fluid flows to retract the main lift cylinder. Upon extending the main lift cylinder 21, hydraulic fluid will flow from the retract side 35 of the main lift cylinder. Upon retracting the main lift cylinder 21, hydraulic fluid will flow from the extend side 34 of the main lift cylinder. Main control valve 33 may be a four-way three-position valve that is electrically controlled such as by controller 61. Main control valve 33 may be configured so that in its default position, no hydraulic fluid passes through the valve. In a second operative position, the main control valve 33 may direct hydraulic fluid through third main conduit member 82 and fourth main conduit member 83 to the extend side 34 of main lift cylinder 21 and, in a third operative position, the main control valve 33 may direct hydraulic fluid through fifth main conduit member 84 and sixth main conduit member 85 to the retract side 35 of the main lift cylinder. In addition, main control valve 33 may also direct hydraulic fluid to the wedge lock control valves 69 for directing the operation of the wedge lock system 67.

Main lift cylinder 21 may include an extend side main selector valve 36 operatively connected to the extend side 34 of the main lift cylinder. Although depicted as being connected through seventh main conduit member 86, the extend side main selector valve 36 may be directly connected to the extend side 34 of the main lift cylinder 21. An eighth main conduit member 87 connects extend side main selector valve 36 to reservoir 32*b*. A retract side main selector valve 37 may be operatively connected to the retract side 35 of the main lift cylinder 21. Although depicted as being connected through ninth main conduit member 88, the retract side main selector valve 37 may be directly connected to the retract side 35 of the main lift cylinder 21. A tenth main conduit member 89 connects retract side main selector valve 37 to reservoir 32*c*.

Each of the extend side main selector valve 36 and the retract side main selector valve 37 may be three-way two-position valves that are electrically controlled such as by controller 61. The extend side main selector valve 36 and the retract side main selector valve 37 may each include a first operative position at which hydraulic fluid may pass through the valve along a first path between the main control valve 33 and the main lift cylinder 21 and a second operative position at which hydraulic fluid may pass through the valve along a second path between the main lift cylinder 21 and the reservoirs 32*b*, and 32*c*, respectively. In an alternate configuration that is not shown, the extend side main selector valve 36 and the retract side main selector valve 37 may be three-way three-position valves that further include a default position at which no hydraulic fluid may flow through the respective valve. Each of the extend side main selector valve 36 and the retract side main selector valve 37 may be electrically operated by controller 61.

An extend side counterbalance valve 41 may be operatively connected to the extend side main selector valve 36 between the extend side main selector valve and the main control valve 33 and, more specifically, between the extend side main selector valve 36 and fourth main conduit member 83. A retract side counterbalance valve 42 may be operatively connected to the retract side main selector valve 37 between the retract side main selector valve and the main control valve 33 and, more specifically, between the retract side main selector valve 37 and sixth main conduit member 85. Each of the counterbalance valves 41 and 42 may act as a selective check valve to prevent hydraulic fluid from moving in a direction opposite that which is desired unless such counterbalance valve has sufficient hydraulic power provided to it through main control valve 33. As such, the counterbalance valves 41, 42 provide an additional measure of safety to reduce the risk that the main lift cylinder 21 will move in an undesired manner.

As depicted in FIG. 5, the main lift cylinder 21 is connected by hydraulic circuitry or main conduit members and valves to main tower pump 31 and one or more reservoirs 32. Each of the follower cylinders 26 may be connected to a follower pump 43 and one or more reservoirs 32 by hydraulic circuitry or follower conduit members and valves that may be identically or similarly configured to those associated with main lift cylinder 21 and tower pump 31. More specifically, a follower pump 43 may be driven by a power supply such as power unit 65 to provide hydraulic fluid from reservoir 32*d* to the follower cylinders 26. In an alternate embodiment, a single pump may replace the main tower pump 31 and the follower pump 43 within power unit 65 with the single pump providing hydraulic power to the entire hydraulic system 30.

Hydraulic fluid is pumped through first follower conduit member 180 from the reservoir 32*d* to the follower pump 43 and from the follower pump through second follower conduit member 181 to follower control valve 44, which is positioned between the follower pump 43 and each of the follower hydraulic cylinders 26.

Each follower cylinder 26 has an extend side 45 into which hydraulic fluid flows to extend the respective follower cylinder and a retract side 46 into which hydraulic fluid flows to retract the respective follower cylinder. Upon extending the follower cylinders 26, hydraulic fluid will flow from the retract side 46 of the follower cylinders. Upon retracting the follower cylinders 26, hydraulic fluid will flow from the extend side 45 of the follower cylinders. Follower control valve 44 may be a four-way three-position valve that is electrically controlled by controller 61 and operates in a manner similar to the main control valve 33. In a default position, flow of hydraulic fluid through the follower control valve 44 is prevented, at a second operative position hydraulic fluid is provided to the extend side 45 of each of the follower cylinders 26, through third follower conduit member 182 and at a third operative position hydraulic fluid is provided to the retract side 46 of each follower cylinder 26 through fourth follower conduit member 183.

The extend side 45 of each follower cylinder 26 may include an extend side follower selector valve 47 and the retract side 46 of each follower cylinder 26 may include a retract side follower selector valve 48 operatively connected thereto. As described above with respect to the main lift cylinder 21, each extend side follower selector valve 47 may be directly connected to the extend side 45 of one of the follower cylinders 26 although they are depicted as being connected through a fifth follower conduit member 184 and each retract side follower selector valve 48 may be directly connected to the retract side 46 of one of the follower cylinders 26 although they are depicted as being connected through a sixth follower conduit member 185. A seventh follower conduit member 186 connects extend side follower selector valve 47 to reservoir 32*b*. An eighth follower conduit member 187 connects retract side follower selector valve 48 to reservoir 32*c*.

Each of the extend side follower selector valves 47 and the retract side follower selector valves 48 may be three-way two-position valves that are electrically controlled by controller 61. In a first operative position, hydraulic fluid will pass through each of the valves 47 and 48 along a first path between the follower control valve 44 and its follower cylinder 26 and at a second operative position, hydraulic fluid will pass through the valves 47 and 48 along a second path between its follower cylinder 26 and the reservoir 32*b* and 32*c*, respectively. In an alternate configuration that is not shown, the extend side follower selector valves 47 and the retract side follower selector valves 48 may be three-way three-position valves that further include a default position at which no hydraulic fluid may flow through the respective valve.

An extend side follower counterbalance valve 51 may be operatively associated with each extend side follower selector valve 47 between the extend side follower selector valve and the follower control valve 44 and, more specifically, between the extend side follower selector valve 47 and third follower conduit member 182. A retract side follower counterbalance valve 52 may be operatively associated with each retract side follower selector valve 48 between the retract side follower selector valve and the follower control valve 44 and more specifically between the retract side follower selector valve 48 and fourth follower conduit member 183. Each of the follower counterbalance valves 51 and 52 may act as a selective check valve to prevent hydraulic fluid from moving in a direction opposite that which is desired unless such counterbalance valve has sufficient hydraulic power provided to it through follower control valve 44. As such, the follower counterbalance valves 51 and 52 provide an additional measure of safety to reduce the risk that the follower cylinders 26 will move in an undesired manner.

From the foregoing description, it may be understood that each of the hydraulic connections to the main cylinder 21 and the follower cylinders 26 may be configured with a selector valve to direct flow into and out of each cylinder and an associated counterbalance valve for preventing flow in an undesired direction through the selector valve. Depending on the position of each selector valve, flow from a cylinder may also bypass the associated counterbalance valve.

In operation, when extending the main lift cylinder 21, the wedge lock control valves 69 are positioned by controller 61 so that hydraulic fluid is provided to the wedge lock system 67 to hydraulically release the wedge locks 68 of the wedge lock system. This permits the sections of the boom member 22 to move upward as the main lift cylinder 21 is extended.

The controller 61 positions the main control valve 33 in a first operative position so that hydraulic fluid is provided by main tower pump 31 to the extend side 34 of main lift cylinder 21 through third main conduit member 82 and fourth main conduit member 83 as depicted by arrows 100, 101. The extend side counterbalance valve 41 is configured so that hydraulic fluid will pass through the valve as depicted by arrow 102 without restriction to extend the main lift cylinder 21. The extend side main selector valve 36 is positioned so that hydraulic fluid from the main control valve 33 may pass through the extend side main selector valve 36 and through seventh main conduit member 86 as depicted by arrow 103 into the extend side 34 of the main lift cylinder 21. Hydraulic fluid is provided to the retract side counterbalance valve 42 through eleventh main conduit member 90 as depicted by arrow 104 to permit hydraulic fluid to pass through the counterbalance valve 42.

Retract side main selector valve 37 is positioned by controller 61 so that hydraulic fluid may pass through the retract side 35 of main lift cylinder 21, through ninth main conduit member 88 at arrow 105, through retract side main selector valve 37, through retract side counterbalance valve 42 at arrow 106, and through sixth main conduit member 85 and fifth main conduit member 84 to reservoir 32*e*.

While the main lift cylinder 21 is being extended, the follower cylinders 26 may be moved upward with the main lift cylinder 21. To do so, the controller 61 actuates the extend side follower selector valve 47 and the retract side follower selector valve 48 so that both are open to the fluid reservoir 32. In doing so, each extend side follower selector valve 47 is positioned so that hydraulic fluid may flow from the reservoir 32*b*, through seventh follower conduit member 186, through extend side follower selector valve 47, and into the extend side 45 of follower cylinder 26. Similarly, each retract side follower selector valve 48 is positioned so that hydraulic fluid may flow from the retract side 46 of follower cylinder 26, through retract side follower selector valve 48, through eighth follower conduit member 187, and into the reservoir 32*c*. In each case, the follower selector valves 47 and 48 cause the flow of hydraulic fluid to bypass the follower counterbalance valve 51 and 52 associated with the selector valves. Follower control valve 44 is positioned to block flow of hydraulic fluid through third follower conduit member 182 and fourth follower conduit member 183.

As the main lift cylinder 21 is extended, the header plate beam 15 will be moved upward. The upward movement of the beam 15 will move the load follower platen 28 associated with each follower cylinder 26, which will force the follower cylinders to move upward. The upward movement of the follower cylinders 26 will draw hydraulic fluid from the reservoir 32*b* through seventh follower conduit members 186 as depicted by arrow 107, around extend side follower counterbalance valve 51 as depicted by arrow 108, through the extend side follower selector valves 47, and into the extend side 45 of the follower cylinders 26. Hydraulic fluid from the retract side 46 of the follower cylinders 26 will pass through the retract side follower selector valves 48, around retract side follower counterbalance valve 52 as depicted by arrow 109, through eighth follower conduit members 187 as depicted by arrow 110, and into the reservoir 32*c*. Through such a configuration, the follower cylinders 26 may move upward without hydraulic fluid being provided by follower pump 43 or through follower control valve 44.

Figure 6:
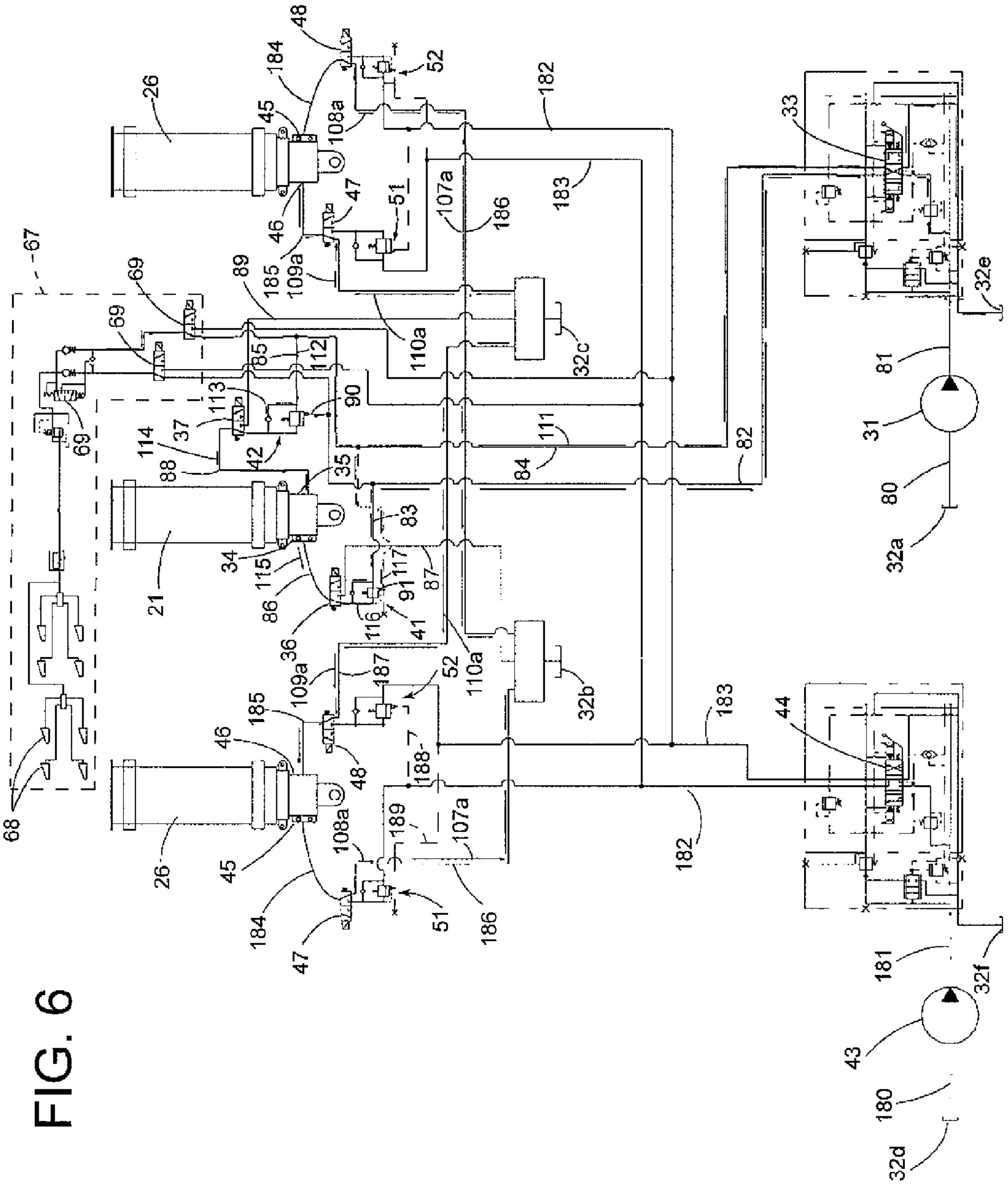
FIG. 6 is a schematic diagram similar to FIG. 5 but depicting the main lift cylinder lowering the lift tower.

Referring to FIG. 6, to retract the main lift cylinder 21, wedge lock control valves 69 are positioned by controller 61 so that hydraulic fluid is provided to the wedge lock system 67 to hydraulically release the wedge locks 68. This permits the sections of the boom member 22 to move downward as the main lift cylinder 21 is retracted.

The main control valve 33 is positioned in its second operative position by controller 61 so that hydraulic fluid is provided to the retract side 35 of the main lift cylinder 21 through fifth main conduit member 84 and sixth main conduit member 85 as depicted by arrows 111 and 112. Retract side counterbalance valve 42 is configured so that hydraulic fluid will pass through the valve as depicted by arrow 113 between the main control valve 33 and the main lift cylinder 21 without restriction. The retract side main selector valve 37 is positioned to allow fluid to travel from the main control valve 33, through retract side counterbalance valve 42, through ninth main conduit member 88 as depicted by arrow 114 into the retract side 35 of the main lift cylinder 21. The extend side main selector valve 36 is positioned by controller 61 so that hydraulic fluid may pass from the extend side 34 of main lift cylinder 21 through seventh main conduit member 86 at arrow 115, through extend side main selector valve 36, through extend side counterbalance valve 41 at arrow 116, and through fourth main conduit member 83 and third main conduit member 82 to reservoir 32*e*.

Hydraulic power is also provided to extend side counterbalance valve 41 through twelfth main conduit member 91 at arrow 117 to permit hydraulic fluid to pass through the valve without restriction so that hydraulic fluid passing from the extend side 34 of the main lift cylinder 21 will pass through the extend side main selector valve 36, through the extend side counterbalance valve 41, and into reservoir 32*e*.

The extend side follower selector valve 47 and the retract side follower selector valve 48 of each follower cylinder 26 are positioned as described above with respect to the process of extending main lift cylinder 21 (FIG. 5) so that hydraulic fluid may pass between both the extend side 45 and the retract side 46 of each follower cylinder 26 and reservoirs 32*b* and 32*c*. Through such a configuration, the follower cylinders 26 may move freely downward as the main lift cylinder 21 is moved downward. It should be noted that since the follower cylinders 26 are moving downward rather than upward, the hydraulic fluid passes through the follower conduit members and the valves in directions opposite those depicted in FIG. 5. Such directions of flow are depicted by arrows corresponding to those in FIG. 5 but with a suffix "a" added to each reference number.

In case of a loss in hydraulic pressure within the circuit of the main lift tower 20, pressure to the wedge lock system 67 will be reduced and the wedge locks 68 will move to their retracted position due to the spring force of the internal springs of the wedge lock system. As a result, the lift tower 11 will be retained in the position at which the hydraulic power was lost. If desired and if the extend side follower selector valve 47 and the retract side follower selector valve 48 are so equipped, the controller 61 may also be configured to respond to a loss in pressure within the hydraulic circuit of the main lift tower 20 by closing the extend side follower selector valve 47 and the retract side follower selector valve 48 associated with each follower cylinder 26. By preventing hydraulic fluid from flowing through the follower cylinders 26, the follower cylinders will provide an additional support for a load on the lift tower 11.

Figure 7:
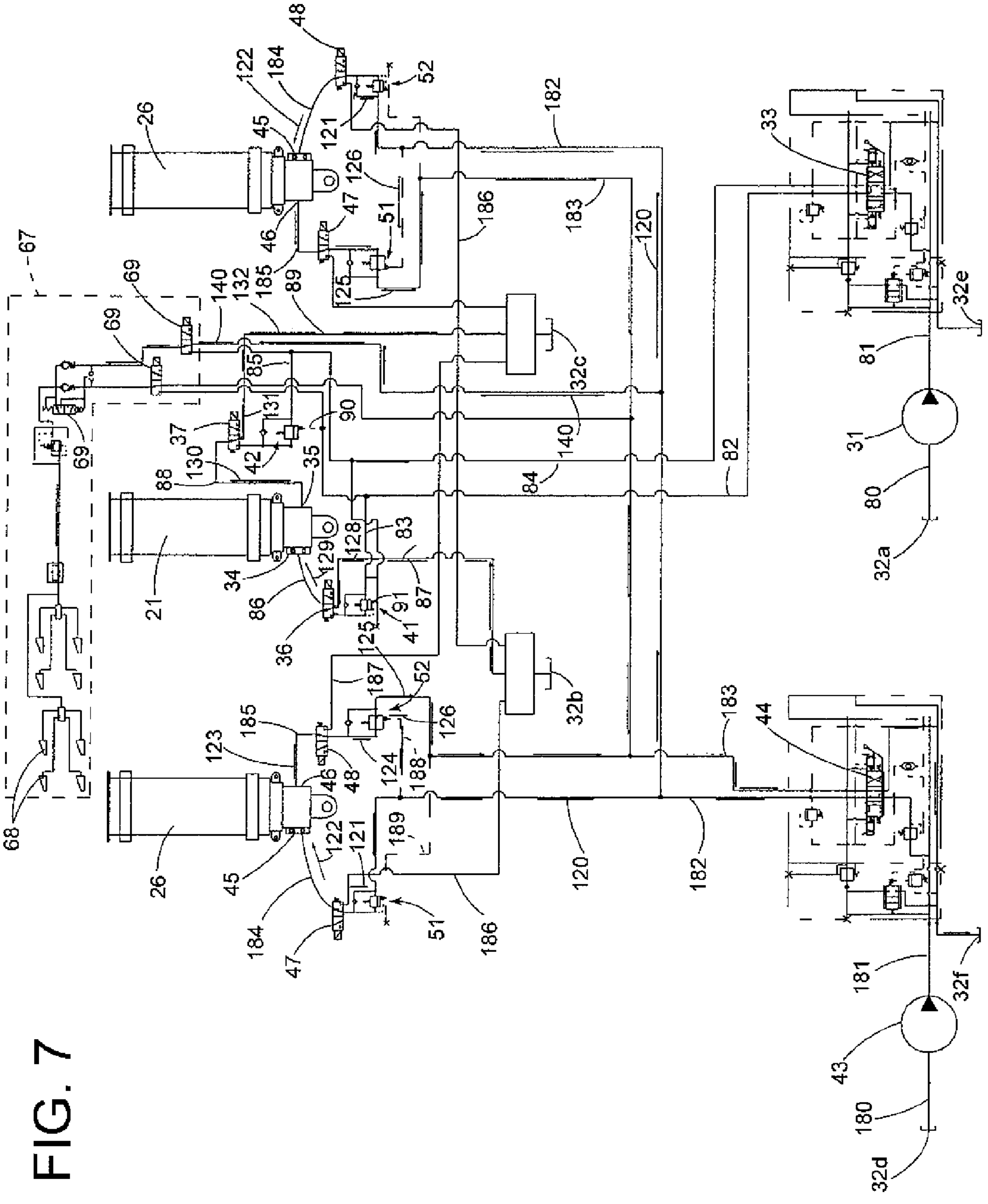
FIG. 7 is a schematic diagram similar to FIG. 5 but depicting the follower cylinders raising the lift tower.
Figure 8:
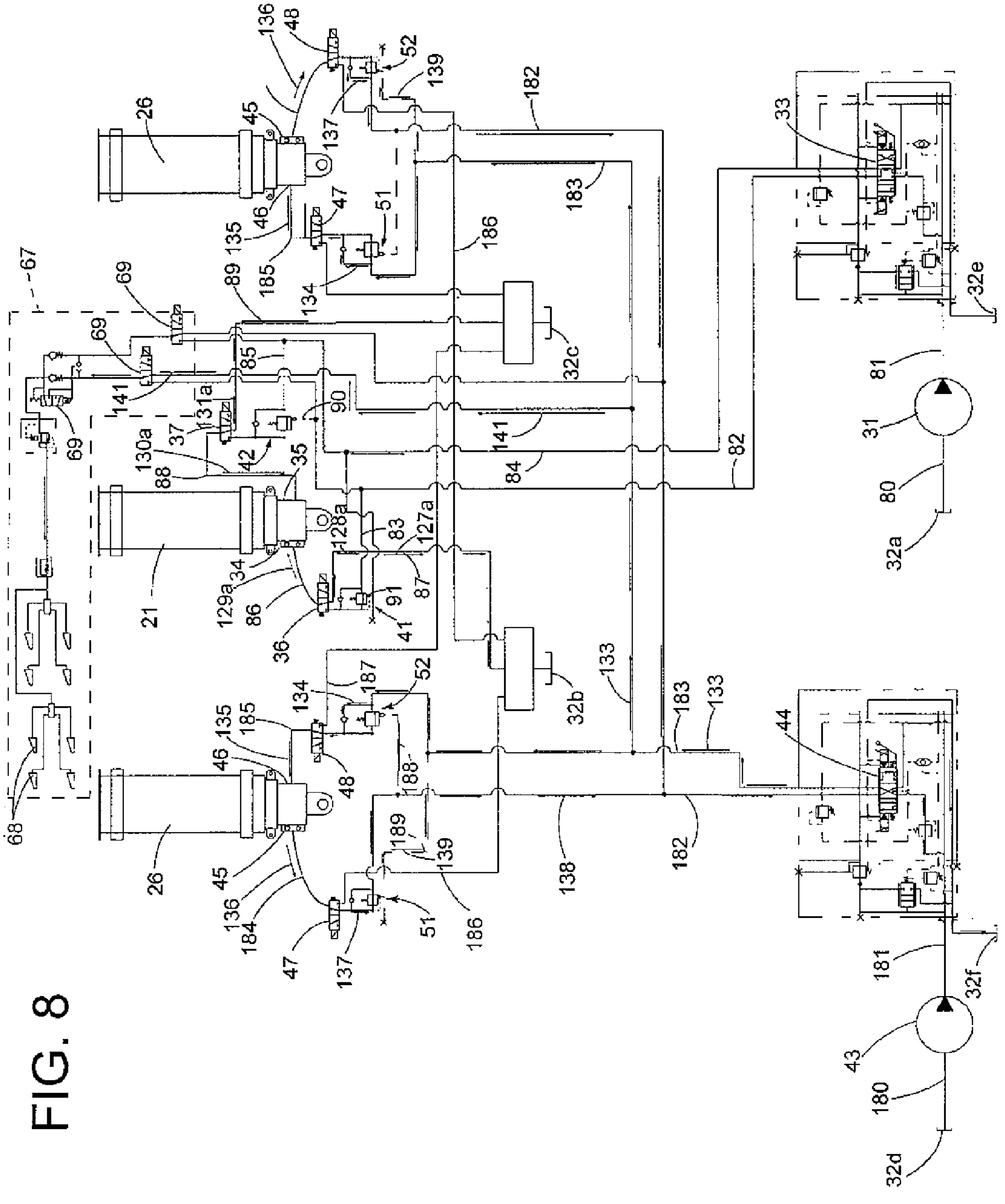
FIG. 8 is a schematic diagram similar to FIG. 5 but depicting the follower cylinders lowering the lift tower.

Upon a failure in the main lift tower 20, the gantry crane system 10 may be configured to operate by using the follower hydraulic cylinders 26 to raise and lower the lifting beam 16. More specifically, if the main lift cylinder 21 fails or if the hydraulic circuit of the main lift cylinder fails, the system 10 may use the follower hydraulic cylinders 26 to perform a desired lifting or lowering operation. Referring to FIGS. 7-8, the follower control valve 44 is shifted by controller 61 to provide the desired hydraulic pressure to the follower hydraulic cylinders 26 and to the wedge lock system 67. The wedge lock control valves 69 are positioned by the controller 61 so as to hydraulically release the wedge locks 68 by providing hydraulic fluid through third follower conduit member 182 as depicted by arrows 140 (FIG. 7) or through fourth follower conduit member 183 as depicted by arrows 141 (FIG. 8). This permits the sections of the boom member 22 to move upward and downward as the follower hydraulic cylinders 26 are extended or retracted.

Referring to FIG. 7, if it is desired to raise the lifting beam 16 by extending the follower hydraulic cylinders 26, the controller 61 positions the follower control valve 44 in a first operative position so that hydraulic fluid is provided by follower pump 43 through third follower conduit member 182 as depicted by arrow 120 to the extend side 45 of follower cylinders 26. The extend side follower counterbalance valves 51 are configured so that hydraulic fluid will pass through the valves as depicted by arrows 121 to extend the follower cylinders 26 without restriction. The extend side follower selector valves 47 are positioned so that hydraulic fluid from the follower control valve 44 may pass through the extend side follower selector valves 47 and through fifth follower conduit members 184 as depicted by arrow 122 into the extend side 45 of the follower cylinders 26. Retract side follower selector valves 48 are positioned by controller 61 so that hydraulic fluid may pass through the retract side 46 of follower cylinders 26, through sixth follower conduit members 185 as depicted by arrows 123, through retract side follower selector valves 48, through retract side follower counterbalance valves 52 as depicted by arrows 124, through fourth follower conduit members 183 as depicted by arrows 125 and to reservoir 32*f*. Hydraulic fluid is provided to the retract side follower counterbalance valves 52 through ninth follower conduit member 188 as depicted by arrow 126 to permit hydraulic fluid to pass through the counterbalance valves 52 and into the reservoir 32*f*.

While the follower cylinders 26 are being extended, the main lift cylinder 21 may be moved upward with the follower cylinders 26. To do so, the controller 61 actuates the extend side main selector valve 36 and the retract side main selector valve 37 so that both are open to the fluid reservoir 32*b* and 32*c*. In doing so, each extend side main selector valve 36 is positioned so that hydraulic fluid may flow from the reservoir 32*b*, through eighth main conduit member 87, through extend side main selector valve 36, and into the extend side 34 of main lift cylinder 21. Similarly, each retract side main selector valve 37 is positioned so that hydraulic fluid may flow from the retract side 35 of main lift cylinder 21, through retract side main selector valve 37, through sixth main conduit member 85, and into the reservoir 32*c*. In each case, the main selector valves 36 and 37 cause the flow of hydraulic fluid to bypass the main counterbalance valve 41 and 42 associated with the selector valves.

As the follower hydraulic cylinders 26 are extended, the header plate beam 15 will be moved upward. The upward movement of the beam 15 will move main platen 23 of the main lift cylinder 21, which will force the main lift cylinder upwards. The upward movement of the main lift cylinder 21 will draw hydraulic fluid from the reservoir 32*b* through eighth main conduit member 87 as depicted by arrow 127, around extend side main counterbalance valve 41 as depicted by arrow 128, through the extend side main selector valve 36, through seventh main conduit member 86 as depicted by arrow 129, and into the extend side 34 of the main lift cylinder 21. Hydraulic fluid from the retract side 35 of the main lift cylinder 21 will pass through ninth main conduit member 88 as depicted by arrow 130, through the retract side main selector valve 37, around retract side main counterbalance valve 22 as depicted by arrow 131, through tenth main conduit member 89 as depicted by arrow 132, and into the reservoir 32*c*. Through such a configuration, the main lift cylinder 21 may move upward without hydraulic fluid being provided by the main tower pump 31 through main control valve 33.

Referring to FIG. 8, to retract the follower hydraulic cylinders 26, wedge lock control valves 69 are positioned by controller 61 so that hydraulic fluid may be provided to the wedge lock system 67 to hydraulically release the wedge locks 68. This permits the sections of the boom member 22 to move downward as the follower hydraulic cylinders 26 are retracted.

The follower control valve 44 is positioned in its second operative position by controller 61 so that hydraulic fluid is provided through fourth follower conduit member 183 as depicted by arrow 133 to the retract side 46 of the follower hydraulic cylinders 26. In doing so, the retract side follower selector valves 48 are positioned to allow fluid to travel from the follower control valve 44 through fourth follower conduit member 183, through retract side follower counterbalance valves 52 as depicted by arrow 134, through retract side follower selector valves 48, through sixth follower conduit member 185 as depicted by arrow 135, and into the retract side 46 of the follower hydraulic cylinders 26. Retract side follower counterbalance valves 52 are configured so that hydraulic fluid will pass through the valves to retract the follower cylinders 26 without restriction.

The extend side follower selector valves 47 are positioned by controller 61 so that hydraulic fluid may pass from the extend side 45 of follower cylinders 26 through fifth follower conduit member 184 as depicted by arrow 136, through extend side follower selector valves 47, through extend side follower counterbalance valves 51 as depicted by arrow 137, through third follower conduit member 182 as depicted by arrow 138, and to reservoir 32*f*. Hydraulic fluid is also provided to extend side follower counterbalance valves 51 through tenth follower conduit member 189 as depicted by arrow 139 so that hydraulic fluid passing from the extend side 45 of the follower hydraulic cylinders 26 and the extend side follower selector valves 47 will flow through the extend side follower counterbalance valves 51 and into reservoir 32.

The extend side main selector valve 36 and the retract side main selector valve 37 of main lift cylinder 21 are positioned as described above with respect to the process of extending the follower cylinders 26 so that hydraulic fluid may pass between both the extend side 34 and the retract side 35 of main lift cylinder 21 and reservoir 32*b* and 32*c*. Through such a configuration, the main lift cylinder 21 may move freely downward as the follower hydraulic cylinders 26 are moved downward. It should be noted that since the main lift cylinder 21 is moving downward rather than upward, the hydraulic fluid passes through the main conduit members and the valves in directions opposite those depicted in FIG. 7. Such directions of flow are depicted by arrows corresponding to those in FIG. 7 but with a suffix "a" added to each reference number.

Other alternative structures and methods of operation are contemplated. For example, in one configuration, the load follower towers 25 may be disconnected from follower cylinders 26 so that the follower cylinders 26 may remain at a retracted position and the load follower towers 25 may move with the header plate beam 15. Once the lifting or supporting power of the follower cylinders 26 is required, hydraulic power may be provided to the follower hydraulic circuit to operate the follower cylinders and to release the counterbalance valves 41 and 42 of the main lift cylinder 21.

In another configuration, rather than providing no hydraulic power to the follower cylinders 26 and bypassing the extend side counterbalance valves 51 and the retract side counterbalance valves 52 when raising and lowering the main lift cylinder 21 as depicted in FIGS. 5-6, a limited amount of hydraulic power may be provided to the follower cylinders 26 so that they operate as depicted in FIGS. 7-8. In such case, the follower cylinders 26 may be provided with enough hydraulic fluid to raise and lower the follower cylinders with the main lift cylinder 21 without the need to rely on power from the main lift cylinder to move the follower cylinders upward. More specifically, the follower control valve 44, the extend side follower selector valve 47, and the retract side follower selector valve 48 may be positioned as described above with respect to FIGS. 7-8 but the amount of fluid power within the follower hydraulic circuit is controlled so that all or substantially all of the lifting of the lift tower 11 is carried out by main lift cylinder 21. The flow within the follower hydraulic circuit may be controlled by limiting the follower pump 43 or through another manner of flow or pressure control.

It will be appreciated that the foregoing description provides examples of the disclosed system and technique. However, it is contemplated that other implementations of the disclosure may differ in detail from the foregoing examples. For example, in another configuration, a single controller 61 and a single pump may be provided. In still another configuration, a controller 61 and a pump may be provided for each of the main lift cylinder 21 and the pair of follower cylinders 26. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A hydraulic lifting apparatus comprising:

a main hydraulic cylinder movable between an extended position and a retracted position;

a main hydraulic circuit operatively connected to the main hydraulic cylinder; and first and second spaced apart follower hydraulic cylinders, each being movable between an extended position and a retracted position, wherein the first and second follower hydraulic cylinders are positioned on opposite sides of the main hydraulic cylinder, and wherein each of the main hydraulic cylinder and the first and second follower hydraulic cylinders support a header beam, and wherein each of the main hydraulic cylinder and the first and second follower hydraulic cylinders are positioned on a common base, and wherein said hydraulic lifting apparatus further includes a follower hydraulic circuit operatively connected to the follower hydraulic cylinders, the follower hydraulic circuit being separate from the main hydraulic circuit, and wherein the main hydraulic circuit includes a main hydraulic pump and the follower hydraulic circuit includes a follower hydraulic pump.

2. The hydraulic lifting apparatus of claim 1, wherein the main hydraulic circuit includes main circuit conduit for fluidly connecting the main hydraulic pump to the main hydraulic cylinder and the follower hydraulic circuit includes follower circuit conduit for fluidly connecting the follower hydraulic pump to the follower hydraulic cylinder, the main circuit conduit being fluidly separate from the follower circuit conduit.

3. The hydraulic lifting apparatus of claim 2, wherein the first and second follower hydraulic cylinders are each operatively connected to the follower hydraulic circuit through components of the follower circuit conduit.

4. A hydraulic lifting system comprising:

a first lift tower and a second lift tower spaced from the first lift tower, the first lift tower and the second lift tower defining an object lifting area between the first lift tower and the second lift tower;

each of the first lift tower and the second lift tower including:

a main hydraulic cylinder movable between an extended position and a retracted position;

a main hydraulic circuit operatively connected to the main hydraulic cylinder;

at least one follower hydraulic cylinder, each follower hydraulic cylinder being movable between an extended position and a retracted position;

a follower hydraulic circuit operatively connected to the at least one follower hydraulic cylinder; and a lifting beam spanning between the first and second lift towers and across the object lifting area, the lifting beam having a beam axis, and the main hydraulic cylinder of each tower being positioned along the beam axis, and wherein the main hydraulic circuit includes a main hydraulic pump and the follower hydraulic circuit includes a follower hydraulic pump.

5. The hydraulic lifting system of claim 4, wherein the main hydraulic circuit is separate from the follower hydraulic circuit.

6. The hydraulic lifting system of claim 5, wherein the main hydraulic circuit includes main circuit conduit for fluidly connecting the main hydraulic pump to the main hydraulic cylinder and the follower hydraulic circuit includes follower circuit conduit for fluidly connecting the follower hydraulic pump to the follower hydraulic cylinder, the main circuit conduit being fluidly separate from the follower circuit conduit.

7. The hydraulic lifting system of claim 4, wherein each lift tower further includes a second follower hydraulic cylinder, the follower hydraulic cylinder and the second follower hydraulic cylinder are each operatively connected to the follower hydraulic circuit.

8. The hydraulic lifting system of claim 4, wherein each lift tower further includes a header beam, the header beam being supported by the main hydraulic cylinder and the at least one follower hydraulic cylinder, the lifting beam extending between and being supported by the header beam of each lift tower.

9. A hydraulic lifting system comprising:

a first hydraulic cylinder movable between an extended position and a retracted position, the first hydraulic cylinder having an extend side and a retract side;

a second hydraulic cylinder movable between a retracted position and an extended position;

a header beam supported by the first hydraulic cylinder and the second hydraulic cylinder;

a hydraulic circuit operatively connected to the first hydraulic cylinder, the hydraulic circuit having an extend side first cylinder selector valve, a retract side first cylinder selector valve, an extend side first cylinder counterbalance valve, and a retract side first cylinder counterbalance valve, the extend side first cylinder selector valve being operatively connected to the extend side of the first hydraulic cylinder, the retract side first cylinder selector valve being operatively connected to the retract side of the first hydraulic cylinder, the extend side first cylinder counterbalance valve regulating flow of hydraulic fluid at the extend side of the first hydraulic cylinder, and the retract side first cylinder counterbalance valve regulating flow of hydraulic fluid at the retract side of the first hydraulic cylinder;

the extend side first cylinder selector valve being movable between first and second operative positions, the hydraulic circuit being configured to permit hydraulic fluid to flow through the extend side first cylinder selector valve and the extend side first cylinder counterbalance valve when the extend side first cylinder selector valve is at the first position, and permit hydraulic fluid to flow through the extend side first cylinder selector valve and bypass the extend side first cylinder counterbalance valve when the extend side first cylinder selector valve is at the second position; and the retract side first cylinder selector valve being movable between first and second operative positions, the hydraulic circuit being configured to permit hydraulic fluid to flow through the retract side first cylinder selector valve and the retract side first cylinder counterbalance valve when the retract side first cylinder selector valve is at the first position, and through the retract side first cylinder selector valve and bypass the retract side first cylinder counterbalance valve when the retract side first cylinder selector valve is at the second position.

10. The hydraulic lifting system of claim 9, wherein the extend side first cylinder counterbalance valve regulates flow of hydraulic fluid out of the extend side of the first hydraulic cylinder and the retract side first cylinder counterbalance valve regulates flow of hydraulic fluid out of the retract side of the first hydraulic cylinder.

11. The hydraulic lifting system of claim 9, wherein the extend side first cylinder selector valve and the retract side first cylinder selector valve are electrically controlled and the extend side first cylinder counterbalance valve and the retract side first cylinder counterbalance valve are hydraulically controlled.

12. The hydraulic lifting system of claim 11, wherein the second hydraulic cylinder has an extend side and a retract side, and further including a second hydraulic circuit operatively connected to the second hydraulic cylinder, the second hydraulic circuit having an extend side second cylinder selector valve, a retract side second cylinder selector valve, an extend side second cylinder counterbalance valve, and a retract side second cylinder counterbalance valve, the extend side second cylinder selector valve being operatively connected to the extend side of the second hydraulic cylinder, the retract side second cylinder selector valve being operatively connected to the retract side of the second hydraulic cylinder, the extend side second cylinder counterbalance valve regulating flow of hydraulic fluid at the extend side of the second hydraulic cylinder, and the retract side second cylinder counterbalance valve regulating flow of hydraulic fluid at the retract side of the second hydraulic cylinder;

the extend side second cylinder selector valve being movable between first and second operative positions, the second hydraulic circuit being configured to permit hydraulic fluid to flow through the extend side second cylinder selector valve and the extend side second cylinder counterbalance valve when the extend side second cylinder selector valve is at the first position, and permit hydraulic fluid to flow through the extend side second cylinder selector valve and bypass the extend side second cylinder counterbalance valve when the extend selector valve is at the second position; and the retract side second cylinder selector valve being movable between first and second operative positions, the second hydraulic circuit being configured to permit hydraulic fluid to flow through the retract side second cylinder selector valve and the retract side second cylinder counterbalance valve when the retract side second cylinder selector valve is at the first position, and through the retract side second cylinder selector valve and bypass the retract side second cylinder counterbalance valve when the retract side second cylinder selector valve is at the second position.

13. The hydraulic lifting system of claim 12, further including a third hydraulic cylinder movable between a retracted position and an extended position, the third hydraulic cylinder having an extend side and a retract side and being operatively connected to the second hydraulic circuit, and the second hydraulic circuit further including an extend side third cylinder selector valve, a retract side third cylinder selector valve, an extend side third cylinder counterbalance valve, and a retract side third cylinder counterbalance valve, the extend side third cylinder selector valve being operatively connected to the extend side of the third hydraulic cylinder, the retract side third cylinder selector valve being operatively connected to the retract side of the third hydraulic cylinder, the extend side third cylinder counterbalance valve regulating flow of hydraulic fluid at the extend side of the third hydraulic cylinder, and the retract side third cylinder counterbalance valve regulating flow of hydraulic fluid at the retract side of the third hydraulic cylinder;

the extend side third cylinder selector valve being movable between first and second operative positions, the second hydraulic circuit being configured to permit hydraulic fluid to flow through the extend side third cylinder selector valve and the extend side third cylinder counterbalance valve when the extend side third cylinder selector valve is at the first position, and permit hydraulic fluid to flow through the extend side third cylinder selector valve and bypass the extend side third cylinder counterbalance valve when the extend selector valve is at the second position; and the retract side third cylinder selector valve being movable between first and second operative positions, the second hydraulic circuit being configured to permit hydraulic fluid to flow through the retract side third cylinder selector valve and the retract side third cylinder counterbalance valve when the retract side third cylinder selector valve is at the first position, and through the retract side third cylinder selector valve and bypass the retract side third cylinder counterbalance valve when the retract side third cylinder selector valve is at the second position.

14. A method of lifting an object comprising:

providing a lifting apparatus including a main hydraulic cylinder movable along a path, a main hydraulic circuit operatively connected to the main hydraulic cylinder, and first and second spaced apart follower hydraulic cylinders;

moving the object along a portion of the path with the main hydraulic cylinder and without the first and second follower hydraulic cylinders; and upon a failure of one of the main hydraulic cylinder and the main hydraulic circuit, moving the object a remaining portion of the path with the first and second follower hydraulic cylinders and without the main hydraulic cylinder.

* * * * *